United States Patent
Osada et al.

(10) Patent No.: US 7,410,686 B2
(45) Date of Patent: Aug. 12, 2008

(54) PROTECTIVE FILM FOR GLASS

(75) Inventors: Syunichi Osada, Otsu (JP); Shigetoshi Maekawa, Takatsuki (JP); Kazumori Sonoda, Otsu (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 11/807,888

(22) Filed: May 30, 2007

(65) Prior Publication Data

US 2007/0231578 A1    Oct. 4, 2007

Related U.S. Application Data

(62) Division of application No. 10/494,214, filed as application No. PCT/JP02/11148 on Oct. 28, 2002, now Pat. No. 7,241,485.

(30) Foreign Application Priority Data

Nov. 9, 2001  (JP)  ............... 2001-344432
Dec. 13, 2001  (JP)  ............... 2001-379895

(51) Int. Cl.
  *B32B 7/02*   (2006.01)
  *B32B 27/08*  (2006.01)
  *B32B 27/36*  (2006.01)
(52) U.S. Cl. ............... 428/212; 428/213; 428/332; 428/339; 428/480; 528/308
(58) Field of Classification Search ............... None
    See application file for complete search history.

(56) References Cited

U.S. PATENT DOCUMENTS

| | | | | |
|---|---|---|---|---|
| 4,066,607 A | * | 1/1978 | Breitenfellner et al. | 524/602 |
| 4,310,584 A | * | 1/1982 | Cooper et al. | 428/212 |
| 4,508,875 A | * | 4/1985 | Kishida et al. | 525/308 |
| 5,304,224 A | | 4/1994 | Harmon | |
| 5,355,636 A | | 10/1994 | Harmon | |
| 5,427,842 A | * | 6/1995 | Bland et al. | 428/213 |
| 5,480,926 A | | 1/1996 | Fagerburg et al. | |
| 5,532,316 A | * | 7/1996 | Shinmura et al. | 525/71 |
| 5,604,019 A | | 2/1997 | Bland et al. | |
| 5,631,124 A | * | 5/1997 | Ikuhara et al. | 430/533 |
| 5,756,651 A | * | 5/1998 | Chen et al. | 528/354 |
| 5,759,467 A | | 6/1998 | Carter et al. | |
| 5,882,774 A | * | 3/1999 | Jonza et al. | 428/212 |
| 5,910,356 A | | 6/1999 | Ishikawa et al. | |
| 6,040,061 A | | 3/2000 | Bland et al. | |
| 6,087,007 A | * | 7/2000 | Fujii et al. | 428/412 |
| 6,111,697 A | * | 8/2000 | Merrill et al. | 359/497 |
| 6,113,811 A | * | 9/2000 | Kausch et al. | 252/585 |
| 6,426,128 B1 | * | 7/2002 | Kimmel et al. | 428/1.6 |
| 6,444,311 B1 | * | 9/2002 | Friedman et al. | 428/354 |
| 6,663,950 B2 | | 12/2003 | Barth et al. | |
| 6,673,425 B1 | * | 1/2004 | Hebrink et al. | 428/212 |
| 6,855,402 B2 | * | 2/2005 | Rabinovitch et al. | 428/212 |
| 6,872,462 B2 | * | 3/2005 | Roberts et al. | 428/516 |
| 7,052,762 B2 | * | 5/2006 | Hebrink et al. | 428/212 |
| 7,241,485 B2 | * | 7/2007 | Osada et al. | 428/212 |
| 2003/0072931 A1 | * | 4/2003 | Hebrink et al. | 428/212 |
| 2004/0121272 A1 | * | 6/2004 | Rao et al. | 430/496 |
| 2005/0020803 A1 | * | 1/2005 | Machida et al. | 528/196 |
| 2007/0026223 A1 | * | 2/2007 | Osada et al. | 428/332 |

FOREIGN PATENT DOCUMENTS

| | | | |
|---|---|---|---|
| EP | 591055 A | | 4/1994 |
| EP | 592284 A | | 4/1994 |
| EP | 0 733 470 | * | 9/1996 |
| EP | 1 295 908 | * | 3/2003 |
| JP | 02-219832 | * | 9/1990 |
| JP | 02-219832 A | | 9/1990 |
| JP | 09-052337 | * | 2/1997 |
| JP | 11-115135 | * | 4/1999 |
| JP | 11-115135 A | | 4/1999 |
| JP | 2000-293113 A | | 10/2000 |
| JP | 2000-329935 A | | 11/2000 |
| JP | 2002-023649 A | | 1/2002 |
| JP | 2002-023649 | * | 2/2002 |
| WO | WO 95/17303 A | | 6/1995 |

OTHER PUBLICATIONS

Schimtz, Peter et al., "Films." Ullmann's Encyclopedia of Industrial Chemistry, 5th Ed., vol. A11 (1988), pp. 85-95, 105-106, 108-110.*

* cited by examiner

*Primary Examiner*—Vivian Chen
(74) *Attorney, Agent, or Firm*—DLA Piper US LLP

(57) ABSTRACT

A glass protecting film including at least 5 or more layers, of which at least one layer is the layer which comprises polyester having 1,4-cyclohexane dimethanol is one of the components, and a glass protecting including a multi-layer structure which comprises at least two kinds of thermoplastic resin, of which the difference of glass transition temperature is 40° C. or less, the face-impact strength is 18 J/mm or more, haze is 3% or less, are films which excel in transparency, tear resistance, and impact resistance, and are suitable for protecting glass and preventing damaged glass fragments.

24 Claims, No Drawings

PROTECTIVE FILM FOR GLASS

CROSS-REFERENCE TO RELATED APPLICATION

This application is a divisional of U.S. Ser. No. 10/494,214 filed May 3, 2004 U.S. Pat No. 7,241,485, which is a §371 of PCT/JP02/11148 filed Oct. 28, 2002 which claims priority of Japanese Application No. 2001-344432 filed Nov. 9, 2001 and Japanese Application No. 2001-379895 filed Dec. 13, 2001.

TECHNICAL FIELD

This disclosure relates to a glass protecting film, and more particularly relates to a glass protecting film suitable for protecting display glass such as a CRT display, liquid crystal display, plasma display, organic EL display, field emission display, and the like, or window glass for automobiles, HST (High-Speed Trains), electric trains, structures such as public facilities, general houses, larger buildings, and the like.

BACKGROUND

In general, glass has been employed for various kinds of purposes, owing to excellent light transmittance, gas barrier properties, dimensional stability, and so forth. Glass has been employed not only for windowpanes for buildings, automobiles, and trains, but also for flat displays in which high-performance glass is employed, represented by CRT displays, liquid crystal displays, plasma displays, organic EL displays, field emission displays, and so forth. However, glass has disadvantages such as easily breaking and scattering upon breaking. This problem is marked in the flat display field where there is great demand for reducing the thickness of glass. As the thickness of the entire flat display is reduced, the display glass employed therein has been reduced, leading to a problem that glass is easily broken at the time of the flat display being used.

Various kinds of proposals have been made for preventing glass from breaking and scattering due to breaking, by applying a film formed of thermoplastic resin onto the glass.

For example, Japanese Unexamined Patent Application Publication No. 6-190997 discloses that applying a multi-layer laminated film formed of a polyethylene terephthalate layer and a sebacic acid copolymerization—polyethylene terephthalate layer onto the surface of glass can markedly prevent glass from damage and scattering.

However, while the method according to Japanese Unexamined Patent Application Publication No. 6-190997 has effects to prevent glass from scattering, on the other hand, this causes crystallization and consequently a hazy appearance over time, since the glass transition temperature of the sebacic acid copolymerization—polyethylene terephthalate layer forming the multi-layer laminated film is low, thereby bringing about a state wherein transmission of visible light deteriorates. In addition, while the method according to Japanese Unexamined Patent Application Publication No. 6-190997 improves tear resistance of a film, this has little effect on improving impact resistance and preventing the glass itself from breaking. Accordingly, the method according to Japanese Unexamined Patent Application Publication No. 6-190997 cannot be employed for a glass protecting film for a flat display which requires continuous high transmittance of visible light and also needs to prevent glass damage itself.

SUMMARY

Our glass protecting films excel in transparency, tear resistance, and impact resistance, and also is suitable for protecting glass and preventing the scattering of broken fragments of glass.

Our glass protection films comprise at least 5 or more layers, of which at least one layer is the layer which comprises polyester having 1,4-cyclohexane dimethanol as one of the components.

Another form of our glass protection films is a glass protecting film comprising a multi-layer structure which comprises at least two kinds of thermoplastic resin of which the difference in glass transition temperature is 40° C. or lower, in which face-impact strength is 18 J/mm or more, and in which haze is 3% or less.

DETAILED DESCRIPTION

First, a description will be made regarding a glass protecting film according to a first aspect, which comprises at least 5 or more layers, of which at least one layer is the layer which comprises polyester having 1,4-cyclohexane dimethanol as one of the components.

The glass protecting film according to the first aspect comprises at least 5 or more layers, of which at least one layer is the layer which comprises polyester having 1,4-cyclohexane dimethanol as one of the components.

The glass protecting film according to the first aspect needs to comprise at least 5 layers or more.

The glass protecting film according to the first aspect needs to comprise at least one layer which comprises polyester having 1,4-cyclohexane dimethanol as one of the components.

"Polyester having 1,4-cyclohexane dimethanol as one of the components" is defined as polyester having, as one of the components, homopolyester in which diol components thereof is 1,4-cyclohexane dimethanol, or copolymer polyester in which diol components thereof is 1,4-cyclohexane dimethanol.

Polyester having 1,4-cyclohexane dimethanol as one of the components may include, as the diol components, ethylene glycol, 1,2-propanediol, 1,3-butanediol, 1,4-butanediol, 1,5-pentadiol, diethylene glycol, polyalkylene glycol, 2,2-bis (4'-β-hydroxyethoxyphenyl) propane, and the like, besides the 1,4-cyclohexane dimethanol.

In the event of at least one layer containing polyester having 1,4-cyclohexane dimethanol as one of the components, a layer which comprises polyester having 1,4-cyclohexane dimethanol, which excels in rigidity and impact absorption, as one of components, prevents propagation of cracking, caused by impact or tear. Consequently, impact resistance and tear resistance improve. Moreover, a layer which comprises polyester having 1,4-cyclohexane dimethanol as one of the components has high transparency, and hardly ever becomes hazy at room temperature over time, so that an image can be precisely recognized in detail through the film.

Moreover, the glass protecting film according to the first aspect preferably comprises 2 or more layers which comprises polyester having 1,4-cyclohexane dimethanol as one of the components, and further preferably comprises 3 or more layers.

The glass protecting film according to the first aspect preferably comprises a layer which comprises thermoplastic resin, besides a layer which comprises polyester having 1,4-cyclohexane dimethanol as one of the components.

As for the thermoplastic resin which is preferably comprised in the glass protecting film according to the first aspect, for example, polyolefine resin such as polyethylene, polypropylene, polymethylpentene, and the like, polyamide resin such as nylon 6, nylon 66, and the like, polyester resin such as polyethylene terephthalate, polybutylene terephthalate, polyethylene-2,6-naphthalate, polycarbonate resin, polyarylate resin, polyacetal resin, polyphenylene sulfide resin, acrylate resin, and so forth can be used. Among these, polyester is preferable from the perspective of strength, heat resistance, and transparency. Furthermore, of the polyester resins, polyethylene-2,6-naphthalate and polyethylene terephthalate are more preferable, and polyethylene terephthalate is particularly preferable.

The above-described resin may be a homopolymer resin, a copolymer, or a blend thereof. Furthermore, various types of additives, for example, antioxidants, antistatic agents, crystal nucleus agents, inorganic particles, organic particles, viscosity reducing agents, heat stabilizers, lubricants, infrared absorbents, ultraviolet absorbents, and so forth, may be added to the above-described resin.

The term "polyester." here means polyester resin which is a polycondensation product of a dicarboxylic acid component skeleton and a diol component skeleton, and polyethylene terephthalate, polybutylene terephthalate, polyethylene-2,6-naphthalate, poly-1,4-cyclohexane dimethylene terephthalate, and the like can be employed, for example. In particular, polyethylene terephthalate is preferable, because it excels in mechanical properties and availability at low prices, and accordingly, it can be widely employed for various purposes. The above-described polyester resin may be a homopolymer resin, a copolymer, or a blend. Examples of dicarboxylic acid components capable of copolymerization include isophthalic acid, phthalic acid, 1,4-naphthalene dicarboxylic acid, 1,5-naphthalene dicarboxylic acid, 2,6-naphthalene dicarboxylic acid, 4-4'-diphenyl dicarboxylic acid, 4,4'-diphenyl sulfone dicarboxylic acid, sebacic acid, dimer acid, and the like.

Also, examples of glycol components capable of copolymerization include 1,2-propanediol, 1,3-butanediol, 1,4-butanediol, 1,5-pentadiol, diethylene glycol, polyalkylene glycol, 2,2-bis (4'-β-hydroxyethoxyphenyl) propane, 1,4-cyclohexane dimethanol, and the like.

With the glass protecting film according to the first aspect, a layer in which polyethylene terephthalate or polyethylene naphthalate is a main component and a layer in which copolymer polyester having 1,4-cyclohexane dimethanol as one of the components is a main component, are preferably alternately layered in the thickness direction. More preferably, a layer in which polyethylene terephthalate is a main component and a layer in which copolymer polyester having 1,4-cyclohexane dimethanol as one of the components is a main component, are preferably alternately layered in the thickness direction. In such a structure, tear resistance, impact resistance, and high transparency can be effectively and simultaneously achieved.

In the glass protecting film according to the first aspect, haze is preferably 3% or less, more preferably 2.5% or less, and particularly preferably 2% or less. When haze is more than 3%, for example, in a case where high transparency is required such as a glass protecting film for a display, it may be difficult to recognize an image in detail through the film.

The glass transition temperatures of thermoplastic resin which is comprised the glass protecting film according to the first aspect is preferably 50° C. or higher in each case, and more preferably 60° C. or higher. Though an upper limit is not particularly stipulated, an upper limit of the glass transition temperature of employed as a glass protecting film is preferable 250° C. or lower, and more preferably 220° C. or lower.

When the glass transition temperature of the thermoplastic resin is lower than 50° C., the thermoplastic resin which is used as a glass protecting film may change in dimensional, change in color, or become hazy due to heat from the sunlight or a display. When the glass transition temperature 250° C. or higher, it may causes difficulties in film formation.

The glass protecting film according to the first aspect can simultaneously achieve improvement of tear resistance and significant improvement of impact resistance and also high transparency, which is impossible with the conventional techniques, by comprising at least one layer which comprising polyester having 1,4-cyclohexane dimethanol as one of the components. Consequently, applying the glass protecting film onto glass enables preventing the glass from damage, and also enables precisely recognizing an image in detail through the film.

Next, description will be made regarding a glass protecting film according to a second aspect, which comprises a multilayer structure which comprises at least two kinds of thermoplastic resin of which the difference in glass transition temperature is 40° C. or lower, in which face-impact strength is 18 J/mm or more, and in which haze is 3% or less.

In the glass protection film according to the second aspect, haze needs to be 3% or less, more preferably 2.5% or less, and most preferably 2% or less. When haze is more than 3% in haze, in a case where high transparency is required such as a glass protecting film for a display, an image cannot be precisely recognized in detail through the film. Reducing haze can be achieved by, for example, a method for reducing particles contained in resin, and a method for reducing the primary particle diameter of particles to 0.1 μm or less. In particular, the content of particles is preferably 0.5% by weight or less, and more preferably 0.1% by weight or less.

The difference in glass transition temperature between the at least two types of thermoplastic resin comprised in the glass protection film according to the second aspect needs to be 40° C. or lower. The difference in the glass transition temperature is more preferably 30° C. or lower, and most preferably 25° C. or lower. Suppressing the difference of the glass temperatures to 40° C. or lower can effectively prevent increase of haze and deterioration of impact resistance in the heat treatment process for forming the film.

The glass transition temperatures of thermoplastic resins which is comprised the glass protection film according to the second aspect are each preferably 50° C. or higher. When the glass transition temperatures of thermoplastic resin are lower than 50° C., dimensional change, change in color, or becoming hazy may be caused due to heat from the sunlight or the display when employed as a glass protecting film.

With regard to the phenomenon wherein breakage due to impact breakage of film are caused, it is considered that effective means for preventing glass from breakage are to improve face-impact-resistance in the initial stage that triggers the breakage, and to improve tear resistance in expansion of broken portions following the initial stage, so to obtain effects preventing glass damage and glass scattering, it is necessary to keep a balance between these two properties.

The glass protection film according to the second aspect needs to have face-impact strength of 18 J/mm or more. When the face-impact strength is less than 18 J/mm, the strength required for a glass protecting film is insufficient to effectively prevent glass from damage and to prevent glass fragments from scattering following glass damage.

Face-impact strength is more preferably 20 J/mm, and in particular preferably 25 J/mm or more. An upper limit of face-impact strength is preferably 100 J/mm or less, though an upper limit is not especially stipulated. When face-impact strength is 100 J/mm or less, handling further improves regarding the work of applying the film onto glass, and thereby it is preferable.

Face-impact strength indicates impact absorption energy which is measured with a falling-weight-impact testing machine conforming to ASTM D3763. An example of the falling-weight-impact testing machine is a graphic impact tester manufactured by Toyo Seiki Inc.

Moreover, a glass protecting film with face-impact strength of 18 J/mm or more is preferably a glass protecting film having impact strength of 8 to 40 J, and more preferably 10 to 40 J. On the other hand, when impact strength is 40 J or more, handling sometimes deteriorates in the work of applying the film onto glass.

Impact strength indicates impact absorption energy which is measured with a pendulum-type-impact testing machine. An example of the pendulum-type-impact-testing machine is a puncture tester manufactured by Testing Machine Inc. The pendulum-type-impact testing machine employs a method for evaluating impact resistance as to the face of a film as with a falling-weight-impact testing machine. A hammer portion of the pendulum-type-impact testing machine preferably has a cone shape so as to measure a thick sample with film thickness of 50 μm or more, and more preferably is a triangular pyramid. In the case of the hammer portion of a triangular pyramid, a glass protecting film with face-impact strength of 18 J/mm may have impact strength of 8 to 40 J.

Accordingly, the glass protecting film according to the second aspect, comprising a multi-layer structure which comprises at least two types of thermoplastic resin of which the difference of glass transition temperature is 40° C. or lower, in which face-impact strength is 18 J/mm or more, and in which haze is 3% or less, may be a glass protecting film comprising a multi-layer structure which comprises at least two types of thermoplastic resin of which difference of glass transition temperature is 40° C. or lower, and in which impact strength is 8 to 40 J, and in which haze is 3% or less.

Examples of thermoplastic resin employed in the glass film according to the second aspect include, for example, polyolefine resin such as polyethylene, polypropylene, polymethylpentene, and the like, polyamide resin such as nylon 6, nylon 66, and the like, polyester resin such as polyethylene terephthalate, polybutylene terephthalate, polyethylene-2,6-naphthalate, polycarbonate resin, polyarylate resin, polyacetal resin, polyphenylene sulfide resin, acrylate resin, and so forth. Polyester is preferable from the perspective of impact resistance, transparency, and heat stability, and polyester in which ethylene terephthalate or ethylene-2,6-naphthalate is a main component is more preferable. In particular, polyethylene terephthalate is preferable, because it has excellent mechanical properties, is available at low costs, and is applicable to wide-ranging purposes.

The above-described resin may be a homopolymer resin, a copolymer, or a blend. Examples of dicarboxylic acid components capable of copolymerization include isophthalic acid, phthalic acid, 1,4-naphthalene dicarboxylic acid, 1,5-naphthalene dicarboxylic acid, 2,6-naphthalene dicarboxylic acid, 4-4'-diphenyl carboxylic acid, 4,4'-diphenyl sulfone dicarboxylic acid, sebacic acid, and dimer acid. Examples of glycol components capable of copolymerization include 1,2-propanediol, 1,3-butanediol, 1,4-butanediol, 1,5-pentadiol, diethylene glycol, polyalkylene glycol, 2,2-bis (4'-β-hydroxyethoxyphenyl) propane, 1,4-cyclohexane dimethanol, and the like.

Furthermore, various types of additives, for example, antioxidants, ultraviolet absorbents, antistatic agents, crystal nucleus agents, fire retardants, inert inorganic particles, organic particles, viscosity reducing agents, heat stabilizers, lubricants, infrared absorbents, and so forth, may be added to the above-described resin as long as the advantages are not inhibited by the additives. In particular, in the event of employing functional particles, providing a layer having the above-described functions onto a film surface layer portion using a method such as coating or the like is more effective in reducing haze than a method for dispersing particles in resin.

With the glass protecting film according to the second aspect, the method for manufacturing thermoplastic resin is not restricted to any particular method.

A layer in which polyethylene terephthalate or polyethylene naphthalate is a main component, and a layer in which copolymer polyester having 1,4-cyclohexane dimethanol as one of the components is a main component, are preferably alternately layered in the thickness direction. More preferably, a layer in which polyethylene terephthalate is a main component, and a layer in which copolymer polyester having 1,4-cyclohexane dimethanol as one of the components is a main component, are preferably alternately layered in the thickness direction. In such a configuration, tear resistance, impact resistance, and high transparency can be effectively and simultaneously achieved.

The glass protecting film according to the second aspect preferably comprises at least one layer which comprises polyester having 1,4-cyclohexane dimethanol as one of the components. Improvement of tear resistance, significant improvement of impact resistance, and also high transparency can be simultaneously achieved by including at least one layer which comprises polyester having 1,4-cyclohexane dimethanol as one of the components. Furthermore, applying a glass protecting film onto glass further improves preventive capabilities for glass damage and also enables precisely recognizing an image in detail through the film.

The glass protecting film according to first and second aspects preferably comprises at least one layer which comprises polyester having 2,2-bis (4'-β-hydroxyethoxyphenyl) propanol as one of components. Improvement of tear resistance, significant improvement of impact resistance, and also high transparency can be simultaneously achieved by including at least one layer which comprises polyester having 2,2-bis (4'-β-hydroxyethoxyphenyl) propanol as one of components. Furthermore, applying our glass protecting films onto glass further improves preventive capabilities for glass damage and also enables precisely recognizing an image in detail through the film. As for compounds having a 2,2-bis (4'-β-hydroxyethoxyphenyl) propane structure, a bisphenol A ethylene oxide additive is preferably employed.

With the first and second aspects, polyester having 1,4-cyclohexane dimethanol as one of the components, copolymerization of 1,4-cyclohexane dimethanol is preferably 20 to 50 mol %, though it is not particularly restricted. Copolymerization of 1,4-cyclohexane dimethanol is more preferably 30 to 40 mol %. When copolymerization of 1,4-cyclohexane dimethanol is 20 to 50 mol %, tear resistant effect remarkably improves.

The laminated constitution of the glass protecting film according to the first aspect needs to comprise at least 5 or more layers.

Also, the laminated constitution of a glass protecting film according to the second aspect needs to comprise at least 2 layers.

Furthermore, the laminated constitution of the glass protecting film according to the first and second aspects is preferably 8 to 256 layers, more preferably 16 to 128 layers, and most preferably 32 to 128 layers. Including 8 or more layers in multi-layer laminated constitution prevents impact from being propagated in the thickness direction, thereby obtaining dramatic glass damage prevention effects.

Also, with the glass protecting film according to the first and second aspects, the following formula (1) is preferably satisfied.

Film thickness: T (µm)
Total number of layers: L $$1.2 \leq T/L \leq 30 \tag{1}$$

$1.5 \leq T/L \leq 25$ is more preferable, and $1.8 \leq T/L \leq 20$ is further preferable. When T/L is less than 1.5, propagation of cracking due to impact cannot be sufficiently prevented, whereby sufficient effects regarding impact resistance and tear resistance cannot be obtained, and thus it is not preferable.

With the glass protecting film according to the first and second aspects, the thickness of a layer containing polyester having 1,4-cyclohexane dimethanol as one of components is preferably 0.05 to 30 µm, more preferably 0.1 to 25 µm, and further preferably 0.2 to 20 µm. When the thickness of a layer which comprises polyester having 1,4-cyclohexane dimethanol as one of the components is thinner than 0.05 µm, sufficient impact resistant capabilities may not be obtained. On the other hand, when the thickness is 30 µm or more, sufficient tear resistant capabilities may not be obtained.

With the glass protecting film according to the first and second aspects, the thickness of the film is preferably 10 to 500 µm, more preferably 20 to 400 µm, and further preferably 50 to 200 µm. When film thickness is less than 10 µm, it may be difficult to manufacture a film with high impact resistance, and on the other hand, when film thickness is greater than 500 µm, it may be difficult to manufacture a film having high transmittance of visible light, and accordingly, handling sometimes deteriorates in the work of applying the film onto glass, and thus is not preferable.

With our glass protecting films, at least one surface layer of a film formed of thermoplastic resin preferably includes an easy-adhesive layer, an adhesive layer, an anti-reflective layer, and a hard coat layer. Various types of conventional known techniques and so forth can be applied for these layers without being restricted to a particular technique. Including these layers in at least one surface layer of a film which comprises thermoplastic resin is preferable, since it allows the film to stick onto glass of a flat display and the like as a glass protecting film, allows preventing reflection of images on the surface of the glass, and also allows preventing cases wherein it is difficult to precisely recognize an image through the film due to scratches.

With the glass protecting film according to the first and second aspects, pencil hardness on at least one side of a film is preferably 2H or harder. 3H or more is more preferable, and 4H or more is further preferable. When pencil hardness is less than 2H, it may be difficult to precisely recognize an image through the film since the surface of the film is readily scratched when employed as a glass protecting film.

As for a method for improving pencil hardness on at least one side of the film to 2H or more, providing a hard coat layer on at least one side of the film is preferable. As for the method for improving abrasion-proofing by improving hardness, a common method wherein hardness is increased can be applied to this case, but a method for preventing the hard coat layer from cracking by reducing the thickness of the hard coat layer beyond the normal thickness is preferably employed.

Though components forming a hard coat layer are not restricted to any particular one, a preferably resin is formed by reaction of a multifunctional (meta)acrylate-containing-compound having at least one (meta)acryloyl group in one molecule. Here, reaction includes the concept of polymerization, copolymerization, degeneration, and so forth.

Specific examples of multifunctional (meta)acrylate include pentaerythritol tri(meta)acrylate, pentaerythritol tetra(meta)acrylate, dipentaerythritol tri(meta)acrylate, dipentaerythritol tetra(meta)acrylate, dipentaerythritol penta(meta)acrylate, dipentaerythritol hexa(meta)acrylate, trimethylol propane tri(meta)acrylate, n-butyl(meta)acrylate, polyester(meta)acrylate, lauryl(meta)acrylate, hydroxyethyl (meta)acrylate, hydroxypropyl(meta)acrylate, and so forth. With these examples, one or more types of monomer may be mixed.

Resin making up a hard coat layer may be formed of a combination of multifunctional (meta)acrylate alone, or may include other well-known reaction compounds. Preferably, the resin includes multifunctional (meta)acrylate by 80 mol % or more.

Though the thickness of the hard coat layer is appropriately selected according to usage, this is commonly 0.5 to 30 µm, and preferably 1 to 8 µm. When the thickness of a hard coat layer is less than 0.5 µm, surface hardness is apt to deteriorate, thereby readily suffering scratches. On the other hand, when the thickness is more than 30 µm, in some cases, cracking may be propagated over the hard coat layer under impact, and accordingly impact strength may be apt to deteriorate. In addition, the hardened film may become fragile, and accordingly, cracking may tend to occur when the film is folded.

With the glass protecting film according to the first and second aspects, transmittance of near-infrared rays is preferably 20% or less, more preferably 18% or less, and further preferably 16% or less. When transmittance of near-infrared rays exceeds 20% and when a film is employed as a glass protecting film for a plasma display, field emission display, CRT display, and so forth, near-infrared rays emitted from the display pass through the glass protecting film may cause control of remote control switches and so forth to behave abnormally.

Though a method for reducing transmittance of near-infrared ray to 20% or less is not restricted to any particular method, this can be achieved by, for example, dispersing a near-infrared absorbent in the thermoplastic resin or the adhesive layer, or providing a near-infrared shielding layer in or on the glass protecting film, or the like.

With the glass protecting film according to the first and second aspects, transmittance of visible light is preferably 70% or more. Transmittance of visible light is more preferably 80% or more, and most preferably 90% or more. When transmittance of visible light is 70% or less, it may be difficult to precisely recognize an image through the film, thereby it is not preferable as a glass protecting film for a display.

Though the method for increasing transmittance of visible light is not restricted to any particular method, for example, a method for reducing difference of refraction indexes between respective thermoplastic resins forming a multi-boundary structure, a method for reducing dispersion diameter thereof to 0.1 µm or less in the event that one or more thermoplastic resins are dispersed in an island shape, and so forth, are preferably employed.

With the glass protecting film according to the first and second aspects, tensile elongation at break is preferably 100 to 300%. Tensile elongation at break is more preferable 130 to 250%. Moreover, tensile stress at break at that time is preferably 120 to 400 MPa, more preferably 150 to 250 MPa. When tensile elongation at break is 100 to 300% and tensile stress at break is 120 to 400 MPa, explosion-protection capabilities of the glass protecting film is excellent, and accordingly, glass breakage and glass fragments scattering following glass breakage is effectively prevented, and thereby it is preferable. Tensile elongation at break of 100 to 300% and tensile stress at break of 120 to 400 MPa is also preferable from a viewpoint of handling in working.

With a laminated film according to the first and second aspects, respective polyester resins which are comprised each layer preferably have a Young's modulus of 1400 MPa or more, and more preferably 2000 MPa or more. Though an upper limit is not particularly stipulated, a Young's modulus of polyester resins is preferably 6000 MPa or less. Polyester having a Young's modulus of 1400 MPa or more is not readily transformed due to outer force, and thereby it is effective for improving face-impact capacity. When the above-described ranges are satisfied, uneven thickness readily may occur in the stretching process for forming the film. Moreover, distortion may occur in images viewed through the film, and it is not preferable. On the other hand, when a Young's modulus exceeds 6000 MPa, it may be difficult to perform stretching at the time of film formation.

With the first and second aspects, tearing-propagation resistance in the longitudinal and/or width direction is preferably 10 N/mm or more, more preferably 30 N/mm or more, and further preferably 50 N/mm or more. When tearing-propagation resistance is less than 10 N/mm, strength may be sometimes insufficient for a film as a glass protecting film to effectively prevent glass breakage and glass fragments scattering following glass breakage.

The glass protecting film according to the first and second aspects can be applied onto the front face of glass for a flat display. The term "flat display" denotes a flat CRT display, a liquid crystal display, a plasma display, an organic EL display, a field emission display, or the like, and in particular, the glass protecting film is suitably employed as a glass protecting film for a flat CRT display or plasma display.

Specific examples regarding a method for manufacturing the glass protecting film will be described, but the films and methods are not restricted to these examples.

Thermoplastic resin is arranged in a form of pellets. Pellets are sufficiently dried in heated air or under vacuum if necessary, following which the dried pellet is supplied to a melting extruder which is heated to a temperature more than the melting point of thermoplastic resin under a nitrogen airflow or under vacuum so as not to deteriorate the intrinsic viscosity, extruded from a die, and cooled over a casting drum with a temperature less than the glass transition point of thermoplastic resin, so as to form an undrawn film. At this time, rapid cooling solidification is preferably performed by contact with a cooling member such as a casting drum and so forth employing electrodes in a wire shape, tape shape, needle shape, knife shape, or the like, using electrostatic force. Moreover, employing various types of filters for eliminating foreign particles, denatured polymer within the melting extruder, for example, a filter formed of material such as sintered metal, porous ceramic, sand, wire mesh, and so forth, is preferable for reduction of haze. Filtration precision of a filter is preferably selected based on the particle diameter of inert particles to be employed, and in particular, it is important to employ a filter with filtration precision capable of eliminating foreign particles and denatured polymer with a particle diameter of 20 μm, preferably a filter formed of wire mesh, in order to reduce haze to 3% or less, preferably 2.5% or less.

Furthermore, following passing through various types of filters, making the extrusion amount uniform by employing a gear pump and the like in the polymer flow path is preferably for reducing layered unevenness of each layer.

An example of a method for obtaining a multi-layer film is a method for layering thermoplastic resin extruded from different flow paths employing two or more extruders in a multi-layer structure employing a multi-manifold die, feed block, static mixer, or the like. Furthermore, these may be optionally combined.

Next, this undrawn film may be stretched in the longitudinal of the film and/or in the width direction. As for a stretching method, a successive biaxial stretching method for successively stretching the undrawn film in the longitudinal direction and in the width direction employing rolls and stenter may be used. Moreover, a simultaneous biaxial stretching method for simultaneously performing longitudinal drawing and lateral stretching of the undrawn film employing a stenter has shorter a process than that in a successive biaxial stretching method, leading to cost reduction, and further, stretching breakages and roll scuffs hardly occur, and thereby is particularly effective in the glass protecting film. Furthermore, a stretching-again-longitudinally method for stretching the film, successively stretched in the lateral and longitudinal directions, in the longitudinal direction again is particularly effective for strengthening the film in the longitudinal direction. Following the above-described method for stretching again longitudinally, a method for stretching again longitudinally and laterally, for stretching the film in the lateral direction again, is extremely effective in the event of further strengthening the film in the lateral direction. A longitudinal-multi-stage-stretching method for stretching a film in two or more steps in the longitudinal direction, and stretching the film in the lateral direction, is particularly effective.

In the event of employing a successive biaxial stretching method, for example, though stretching conditions in the longitudinal direction vary depending on the thermoplastic resin employed, 2 to 15 times is commonly preferable, 2.5 to 10 times is preferable in a case of employing polyester resin, and 3.0 to 5 times is further preferable. Moreover, the stretching speed is preferably 1000 to 50000%/minute, and the stretching temperature is preferably the glass transition temperature of Tg of the thermoplastic resin having the highest component ratio or higher, and (glass transition temperature +50° C.) or lower, thereby obtaining a uniaxial orientation film by stretching the film in the longitudinal direction.

An easy-adhesive layer, easy-sliding layer, or high light-ray transmittance may be provided on the surface of the drawn film thus obtained by being subjected to coating employing a well-known coating technique such as gravure coater or metalling bar. These coatings may be dispensed off-line following biaxial stretching, or in-line by being introduced between the longitudinal stretching process and lateral stretching process. In particular, in the event of employing functional particles, a technique for performing application on the surface of a film employing a technique such as coating and so forth is more effective than a technique for dispersing particles in the resin, to improve transmittance of all light rays and reduce haze values.

With stretching in the width direction, employing a tenter which has been conventionally employed, the stretching temperature is preferably the glass transition temperature of Tg of thermoplastic resin having the highest component ratio or higher, and (glass transition temperature Tg +80° C.) or lower, more preferably the glass transition temperature of Tg or higher but (glass transition temperature Tg +40° C.) or lower, and the stretching is preferably 2.0 to 10 times, more preferably 2.5 to 5 times. At that time, the stretching speed is not especially restricted, but 1000 to 50000%/minute is preferable.

Furthermore, a biaxial orientation film may be subjected to stretching in at least one direction of longitudinal direction and with direction again if necessary. In this case, with longitudinal stretching which is performed again, the stretching temperature is preferably (glass transition temperature of Tg +20° C.) of thermoplastic resin having the highest component ratio or higher, and (glass transition temperature +120° C.) or lower, more preferably (glass transition temperature of Tg +50° C.) or higher but (glass transition temperature +100° C.) or lower, and stretching is preferably 1.2 to 2.5 times, more preferably 1.2 to 1.7 times. Moreover, with lateral stretching which is performed following longitudinal stretching, the stretching temperature is preferably (glass transition temperature of Tg +20° C.) of thermoplastic resin having the highest component ratio or higher but (glass transition temperature +150° C.) or less, more preferably (glass transition temperature of Tg +50° C.) or higher but (glass transition temperature +130° C.) or lower, and stretching is preferably 1.02 to 2 times, more preferably 1.1 to 1.5 times.

Alternately, in the event of drawing with a simultaneous biaxial stretching method, a simultaneous biaxial stretching method with a tenter which employs a linear motor driving method is preferably employed. With a stretching temperature of a simultaneous biaxial stretching method, the glass transition temperature of Tg of thermoplastic resin having the highest component ratio or higher but (glass transition temperature tg +50° C.) or lower is preferable. In the event of the stretching temperature drastically deviates from this range, uniform drawing cannot be performed, and uneven thickness and film breaks sometimes occurs, which is undesirable. Stretching magnification is preferably 3 to 10 times in each of the longitudinal and lateral directions. The stretching speed is not particularly restricted, but 2000 to 50000%/minute is preferable.

Next, to reduce heat shrinkage and provide planarity to a film, heat treatment is performed if necessary.

To obtain high mechanical properties wherein extension of fracture is 100 to 300% in at least one direction of the longitudinal and width directions, and stress of fracture is 120 to 400 MPa therein, and to obtain thermal dimensional stability, preferable heat treatment conditions are to perform heat treatment in a range between the glass transition temperature of Tg of thermoplastic resin having the highest component ratio and (glass transition temperature +100° C.), either at its natural length, slightly stretched, or in a slacked state, for 0.5 to 60 seconds.

To obtain low haze, most preferred treatment conditions include performing heat treatment in a range between (glass transition temperature tg +40° C.) of thermoplastic resin having the highest component ratio and (glass transition temperature +80° C.) for 0.5 to 10 seconds. In the event that the stretching temperature is lower than (glass transition temperature tg +40° C.) of thermoplastic resin having the highest component ratio, heat shrinkage may become large, on the other hand, in the event that the stretching temperature is higher than (glass transition temperature +80° C.) of the thermoplastic resin having the highest component ratio, haze increases, and impact resistance may deteriorate.

With a glass protecting film in which transmittance of visible light is 70% or more, preferably 80% or more, more preferably 90% or more, anti-reflective layer is preferably on one surface layer of the film. Anti-reflective layer is not particularly restricted to any one, so conventionally well-known techniques may be used.

The biaxial orientated film which has been heat-treated as occasion demands is slowly cooled down to a room temperature and rewound with a winder. A slow cooling method is preferable for slowly cooling the film down to a room temperature in two or more divided steps. At this time, performing relaxation of 0.5 to 10% around in the longitudinal and width directions is effective for reducing thermal dimensional stability. As for a cooling temperature, a first step is preferably a range between (heat treatment temperature −80° C.) and (heat treatment temperature −20° C.), and a second step is preferably a range between (the temperature of the first step −40° C.) and (the temperature of the first step −30° C.), but not restricted to this.

Evaluation methods for physical properties will be described.

Evaluation Methods for Physical Properties:

(1) Tear Strength and Tearing-propagation Resistance

Tear strength was measured with a heavy-loading-tear testing machine manufactured by Toyo Seiki Inc. Samples 60 mm wide and 70 mm long in size were slit up on a central portion in the width direction from the end thereof by 20 mm, and the remained 50 mm was torn, and an indicating value was read out. Also, multiplying this indicating value (g) by 9.8 provided tear strength (mN). Note that this tearing strength was a mean obtained from the test results of respective 5 samples in the longitudinal direction and in the lateral direction. Also, tearing strength per film thickness of 1 mm was obtained as tearing-propagation resistance (N/mm).

(2) Transmittance of all Light Rays and Haze

Measurement was performed with a direct-reading hazemeter manufactured by Suga Test Instruments Co. Ltd. Haze values (%) were obtained from dividing diffusion transmittance by transmittance of all light rays, and multiplied by 100.

(3) Falling-Ball Impact-Absorption Energy

Measurement was performed with a falling-ball testing machine manufactured by DAIEI KAGAKU SEIKI MFG CO. LTD. Measurement was performed in a situation wherein a metal sphere (weight: 1.809 kg) disposed at 2.5 m height above a test film which was fixed in a frame was dropped, and measured values were obtained from the passing of time between two points of upper and lower portions of the test film in the event of breaking the test film. Note that lubricant "Three Bond 1804" was blown onto the surface of the test film by spraying. Note that the falling-ball impact-absorption energy E(J) was obtained from the following expression, and a mean of 5 samples was adopted.

$$E = 1.809 \times (1/t_0^2 - 1/t_1^2)/200$$

$t_0$: passing time without test films (ms)
$t_1$: passing time with test films (ms)

(4) Glass Scattering Prevention Test

Measurement was performed conforming to JIS A5759-1998 A method. A rating of a double circle was given in the event that glass was not broken, a circle in the event that glass was broken without scattering, and a cross in the event that glass was broken with scattering. Of these, the items with the double circle or the circle rating passed this test.

(5) Near-infrared Ray Transmittance

Measurement was performed with a spectrophotometer MPC-3100. Transmittance of all light rays on a range between wavelength of 800 nm and wavelength of 2100 nm was measured, and the average light ray transmittance in a near-infrared region between 800 nm and 1200 nm was taken as near-infrared ray transmittance.

(6) Pencil Hardness

Measurement was performed conforming to JIS-K5400. Measurement was performed in a situation wherein pencils with various hardness were pressed against a film layer at an angle of 90°, and the pencil hardness is the hardness of the pencil at the time of a scratch occurring when scratching under a weight of 1 kg.

(7) Intrinsic Viscosity

Measurement was performed at a temperature of 25° C. employing orthochlorophenol as a solvent.

(8) Layer Structure and Layer Thickness

The layer structure of the film was obtained by cross-section observation. That is to say, measurement was performed in a situation wherein a cross-section of a film was enlarged 3000 to 200000 times and observed employing a HU-12 model transmission electron microscope manufactured by Hitachi, Ltd., then cross-sectional photographs were taken, and layer structure and each layer thickness was measured.

(9) Impact Strength

Measurement was performed employing a pendulum-type-impact testing machine manufactured by Testing Machines Inc. Measurement was performed in a situation wherein in the event that a film fixed to a frame was subjected to impact in the vertical direction employing a hammer in a triangular pyramid, difference of positional energy between a hammer uplifted position and downstroke position was read out by an indicating needle when breakage was detected, and this impact absorption energy was taken as impact strength (J). The shape of the hammer was a triangular pyramid, 62 mm on each side one the bottom, and a height of 25 mm, which was attached with a weight of 10 kg. The height from an impact point of the sample film to the hammer uplifted position was 300 mm. Note that with the test, 10 samples were measured while changing the orientation of the film to be adhered to a frame at an angle of 90° at a time, and a mean value thereof was obtained.

(10) Glass Transition Temperature

Measurement was performed employing a DSC RDC220 manufactured by Seiko Instruments Inc. as a differential scanning calorimeter, and a disk station SSC/5200 also manufactured by the same company as a data analyzer. The measurement of a glass transition temperature Tg (° C.) was performed in a situation wherein a sample of approximately 5 mg was enclosed in an aluminum pan, held at 300° C. for 5 minutes, subjected to rapid cooling with liquid nitrogen, and then measured at programming rate of 20° C./minute.

(11) Tensile Stress at Break and Tensile Elongation at Break

Measurement was performed conforming to the following method stipulated in ASTM-D882 and employing an instron-type tensile tester ("Tensilon AMF/RTA-100" tensile strength automatic tester, manufactured by Orientec). A 10 mm wide sample film was stretched under the conditions of a testing distance of 100 mm and a pulling speed of 200 mm/minute. Tensile stress at break and tensile elongation at break were obtained from the yield fracture point of a tension-strain curve. The measurement was performed in an atmosphere of 25° C. and 65%/RH.

(12) Face Impact Strength

Measurement was performed conforming to ASTM D 3763 and employing a graphic impact tester manufactured by Toyo Seiki Inc. Full impact absorption energy (J) at the time of the cone passing through the film was converted into increments of thickness (1 mm), thereby obtaining the face impact strength (J/mm).

(13) Young's Modulus

Young's modulus of thermoplastic resin which was comprised each layer was measured conforming to ASTM test method D882-88. An undrawn film was employed as a sample film, which was obtained by being subjected to rapid cooling solidification on a casting drum controlled at a temperature of 25° C. so as to improve contact of the drum and film with a known electrostatic applying device. The measurement was performed employing an instron-type tensile tester ("Tensilon AMF/RTA-100". tensile strength automatic tester, manufactured by Orientec). A 10 mm wide sample film was stretched under the conditions of a testing distance of 100 mm and a pulling speed of 200 mm/minute so as to obtain the Young's modulus.

(14) Hardened-Glass Falling-Ball Test

To study resistance as to impact strength stronger than a glass scattering prevention test, a hardened-glass falling-ball test was performed conforming to the JIS R3206 falling-ball test. The test was performed in a situation wherein a film was applied onto one face of glass, and a rigid sphere was dropped on the other face of the glass to which the film was not applied. This test was performed for 2 specimens, as a result, in the event that the rigid sphere passed through all 2 specimens, this was rated with a cross, and in the event that the rigid sphere did not pass through at least 1 specimen, this was rated with a circle, and accordingly, those rated with a circuit indicated passing this test. For the glass, 5-mm-thick float glass was employed. As for the rigid sphere, a sphere with a diameter of 82 mm and weight of 2260 g was employed. The falling height of the rigid sphere was 3.0 m.

We now refer to representative examples.

EXAMPLE 1

Polyethylene terephthalate (glass transition temperature of 81° C., Young's modulus of 1990 MPa) having intrinsic viscosity of 0.8 was employed as a thermoplastic resin A. Copolymer polyester (Easter PETG9921 manufactured by Eastman Chemical Company) (glass transition temperature of 82° C., Young's modulus of 2200 MPa) in which terephthalic acid as dicarboxylic acid components, 1,4-cyclohexane dimethanol of 10 mol % and ethylene glycol of 90 mol % as diol components were copolymerized, was employed as a thermoplastic resin B. The thermoplastic resins A and B were each dried, and then supplied to an extruder.

The thermoplastic resin A and B were each in a molten state of 280° C. at the extruder, and combined at a field block following passing through a gear pump and filter. The combined thermoplastic resin A and B were supplied to a static mixer, and a structure formed of 65 layers of the thermoplastic resin A and 64 layers of the thermoplastic resin B formed of 64 layers, alternately layered in the thickness direction, was formed. Here, adjustment was made with the discharge rate such that ratio of laminated thickness was A/B=5. A laminated member made up of the thus-obtained 129 layers in total was supplied to a T-die and molded in a sheet shape, and then was subjected to rapid cooling solidification on a casting drum held at a surface temperature of 25° C., while being subjected to electrostatic application.

The obtained cast film was heated at a roll group set at 90° C., stretched 3.2 times in the longitudinal direction, introduced to a tenter, preheated in hot air of 100° C., and then stretched by 3.3 times in the lateral direction. The drawn film, was subjected without any change to heat treatment in hot air of 150° C. within the tenter, slowly cooled down to a room temperature, and then rolled up. The obtained film thickness was 188 μm. The obtained results are shown in Table 1.

EXAMPLE 2

A laminated film was formed of 33 layers of the thermoplastic resin A and 32 layers of the thermoplastic resin B, the discharge rate of the resin was adjusted such that film thickness was 188 μm, and a drawn film made up of 65 layers in total was obtained with the same equipment and conditions as with Example 1. The impact strength of the obtained film was 14 J. The obtained results are shown in Table 1.

EXAMPLE 3

For a layering device, a 33 layer laminated field block alone was employed, and a laminated film was formed of 17 layers of thermoplastic resin A and 16 layers of the thermoplastic resin B, the discharge rate of the resin was adjusted such that the film thickness was 188 μm, a drawn film made up of 33 layers in total was obtained with the same equipment and conditions as with Example 1. The obtained results are shown in Table 1.

EXAMPLE 4

For a layering device, a 17 layer laminated field block alone was employed, and a laminated film was formed of 9 layers of the thermoplastic resin A and 8 layers of the thermoplastic resin B, the discharge rate of the resin was adjusted such that the film thickness was 188 μm, and a drawn film made up of 17 layers in total was obtained with the same equipment and conditions as with Example 1. The impact strength of the obtained film was 14 J. The obtained results are shown in Table 1.

EXAMPLE 5

For a layering device, an 8 layer multi-manifold die alone was employed, and a laminated film was formed of 4 layers of the thermoplastic resin A and 3 layers of the thermoplastic resin B, the discharge rate of the resin was adjusted such that the film thickness was 188 μm, and a drawn film made up of 7 layers in total was obtained with the same equipment and conditions as with Example 1. The obtained results are shown in Table 1.

EXAMPLE 6

The laminated thickness ratio A/B between the thermoplastic resin A and the thermoplastic resin B was 2, the discharge rate of the resin was adjusted such that the film thickness was 188 μm, and a drawn film made up of 65 layers in total was obtained with the same equipment and conditions as with Example 2. The obtained results are shown in Table 1.

EXAMPLE 7

The laminated thickness ratio A/B between the thermoplastic resin A and the thermoplastic resin B was 10, the discharge rate of the resin was adjusted such that the film thickness was 188 μm, and a drawn film made up of 65 layers in total was obtained with the same equipment and conditions as with Example 2. The obtained results are shown in Table 1.

TABLE 1

| | | | UNIT | EXAMPLE 1 | EXAMPLE 2 | EXAMPLE 3 | EXAMPLE 4 |
|---|---|---|---|---|---|---|---|
| COMPONENTS | THERMO-PLASTIC RESIN A | NAME OF RESIN | — | PET | PET | PET | PET |
| | | INTRINSIC VISCOSITY | — | 0.8 | 0.8 | 0.8 | 0.8 |
| | | Tg | ° C. | 81 | 81 | 81 | 81 |
| | THERMO-PLASTIC RESIN B | NAME OF RESIN | — | PETG 9921 | PETG 9921 | PETG 9921 | PETG 9921 |
| | | Tg | ° C. | 82 | 82 | 82 | 82 |
| | SURFACE LAYER | | — | — | — | — | — |
| LAYERING | NO. OF LAYERS | | — | 129 | 65 | 33 | 17 |
| | LAYERING RATIO A/B | | — | 5 | 5 | 5 | 5 |
| | FILM THICKNESS | | μm | 188 | 188 | 188 | 188 |
| FILM FORMATION | STRETCHING | MD | TIMES | 3.2 | 3.2 | 3.2 | 3.2 |
| | | TD | TIMES | 3.3 | 3.3 | 3.3 | 3.3 |
| | HEAT TREATMENT TEMPERATURE | | ° C. | 150 | 150 | 150 | 150 |
| PHYSICAL PROPERTIES OF FILM | TRANSMITTANCE OF ALL LIGHT RAYS | | % | 92 | 92 | 92 | 92 |
| | HAZE | | % | 2 | 2 | 2 | 2 |
| | TEAR STRENGTH | | mN | 9160 | 10020 | 9500 | 8439 |
| | FALLING-BALL IMPACT ABSORPTION ENERGY | | J | NO FRACTURES | NO FRACTURES | NO FRACTURES | NO FRACTURES |
| | GLASS SCATTERING PREVENTION TEST | | — | ○ | ◎ | ◎ | ◎ |

| | | | EXAMPLE 5 | EXAMPLE 6 | EXAMPLE 7 |
|---|---|---|---|---|---|
| COMPONENTS | THERMO-PLASTIC | NAME OF RESIN | PET | PET | PET |

TABLE 1-continued

|  |  |  |  |  |  |
|---|---|---|---|---|---|
| | RESIN A | INTRINSIC VISCOSITY | 0.8 | 0.8 | 0.8 |
| | | Tg | 81 | 81 | 81 |
| | THERMO-PLASTIC RESIN B | NAME OF RESIN | PETG 9921 | PETG 9921 | PETG 9921 |
| | | Tg | 82 | 82 | 82 |
| | | SURFACE LAYER | — | — | — |
| LAYERING | | NO. OF LAYERS | 7 | 65 | 65 |
| | | LAYERING RATIO A/B | 5 | 2 | 10 |
| | | FILM THICKNESS | 188 | 188 | 188 |
| FILM FORMATION | | STRETCHING MD | 3.2 | 3.2 | 3.2 |
| | | TD | 3.3 | 3.3 | 3.3 |
| | | HEAT TREATMENT TEMPERATURE | 150 | 150 | 150 |
| PHYSICAL PROPERTIES OF FILM | | TRANSMITTANCE OF ALL LIGHT RAYS | 92 | 92 | 92 |
| | | HAZE | 2 | 2 | 2 |
| | | TEAR STRENGTH | 5300 | 7366 | 8199 |
| | | FALLING-BALL IMPACT ABSORPTION ENERGY | NO FRACTURES | NO FRACTURES | NO FRACTURES |
| | | GLASS SCATTERING PREVENTION TEST | ◎ | ◎ | ○ |

Tg: GLASS TRANSITION TEMPERATURE
MD: LONGITUDINAL DIRECTION OF FILM
TD: WIDTH DIRECTION OF FILM

EXAMPLE 8

Polyethylene terephthalate (glass transition temperature of 81° C., Young's modulus of 1990 MPa) having intrinsic viscosity of 0.65 was employed as the thermoplastic resin A, and a drawn film made up of 65 layers in total was obtained with the same equipment and conditions as with Example 2. The obtained results are shown in Table 2.

EXAMPLE 9

Copolymerized polyester (Easter PETG6763 manufactured by Eastman Chemical Company) (glass transition temperature of 81° C., Young's modulus of 1700 MPa) in which terephthalic acid as the dicarboxylic acid component, and 30 mol % 1,4-cyclohexane dimethanol and 70 mol % ethylene glycol as the diol component were copolymerized, was employed as the thermoplastic resin B, and a drawn film made up of 65 layers in total was obtained with the same equipment and conditions as with Example 2. The obtained results are shown in Table 2.

EXAMPLE 10

Polycyclohexane dimethalate (hereafter, referred to as "PCT") (glass transition temperature of 95° C., Young's modulus of 1750 MPa) in which terephthalic acid as the dicarboxylic acid component, and 100 mol % 1,4-cyclohexane dimethanol as the diol component were polymerized, was employed as the thermoplastic resin B, and a drawn film made up of 65 layers in total was obtained with the same equipment and conditions as with Example 2. The obtained results are shown in Table 2.

EXAMPLE 11

Copolymer polyester (Duraster DS2010 manufactured by Eastman Chemical Company) (glass transition temperature of 89° C., Young's modulus of 1750 MPa) in which 1,4-cyclohexane dimethanol and isophthalic acid were copolymerized, was employed as the thermoplastic resin B, and a drawn film made up of 65 layers in total was obtained with the same equipment and conditions as with Example 2. The obtained results are shown in Table 2.

EXAMPLE 12

The discharge rate of the resin was adjusted such that the film thickness was 150 μm, and a drawn film made up of 65 layers in total was obtained with the same equipment and conditions as with Example 2. The impact strength of the obtained film was 14 J. The obtained results are shown in Table 2.

EXAMPLE 13

The discharge rate of the resin was adjusted such that the film thickness was 120 μm, and a drawn film made up of 65 layers in total was obtained with the same equipment and conditions as with Example 2. The obtained results are shown in Table 2.

EXAMPLE 14

The discharge rate of the resin was adjusted such that the film thickness was 100 μm, and a drawn film made up of 65 layers in total was obtained with the same equipment and conditions as with Example 2. The impact strength of the obtained film was 9 J. The obtained results are shown in Table 2.

TABLE 2

| | | | UNIT | EXAMPLE 8 | EXAMPLE 9 | EXAMPLE 10 | EXAMPLE 11 |
|---|---|---|---|---|---|---|---|
| COMPONENTS | THERMO-PLASTIC RESIN A | NAME OF RESIN | — | PET | PET | PET | PET |
| | | INTRINSIC VISCOSITY | — | 0.65 | 0.8 | 0.8 | 0.8 |
| | | Tg | °C. | 81 | 81 | 81 | 81 |
| | THERMO-PLASTIC RESIN B | NAME OF RESIN | — | PETG 9921 | PETG 6763 | PCT | DS2010 |
| | | Tg | °C. | 82 | 81 | 95 | 89 |
| | SURFACE LAYER | | — | — | — | — | — |
| LAYERING | No. OF LAYERS | | — | 65 | 65 | 65 | 65 |
| | LAYERING RATIO A/B | | — | 5 | 5 | 5 | 5 |
| | FILM THICKNESS | | μm | 188 | 188 | 188 | 188 |
| FILM FORMATION | STRETCHING | MD | TIMES | 3.2 | 3.2 | 3.2 | 3.2 |
| | | TD | TIMES | 3.3 | 3.3 | 3.3 | 3.3 |
| | HEAT TREATMENT TEMPERATURE | | °C. | 150 | 150 | 150 | 150 |
| PHYSICAL PROPERTIES OF FILM | TRANSMITTANCE OF ALL LIGHT RAYS | | % | 92 | 92 | 92 | 92 |
| | HAZE | | % | 2 | 2 | 2 | 2 |
| | TEAR STRENGTH | | mN | 10010 | 12030 | 11937 | 10447 |
| | FALLING-BALL IMPACT ABSORPTION ENERGY | | J | NO FRACTURES | NO FRACTURES | NO FRACTURES | NO FRACTURES |
| | GLASS SCATTERING PREVENTION TEST | | — | ◎ | ◎ | ◎ | ◎ |

| | | | EXAMPLE 12 | EXAMPLE 13 | EXAMPLE 14 |
|---|---|---|---|---|---|
| COMPONENTS | THERMO-PLASTIC RESIN A | NAME OF RESIN | PET | PET | PET |
| | | INTRINSIC VISCOSITY | 0.8 | 0.8 | 0.8 |
| | | Tg | 81 | 81 | 81 |
| | THERMO-PLASTIC RESIN B | NAME OF RESIN | PETG 9921 | PETG 9921 | PETG 9921 |
| | | Tg | 82 | 82 | 82 |
| | SURFACE LAYER | | — | — | — |
| LAYERING | No. OF LAYERS | | 65 | 65 | 65 |
| | LAYERING RATIO A/B | | 5 | 5 | 5 |
| | FILM THICKNESS | | 150 | 120 | 100 |
| FILM FORMATION | STRETCHING | MD | 3.2 | 3.2 | 3.2 |
| | | TD | 3.3 | 3.3 | 3.3 |
| | HEAT TREATMENT TEMPERATURE | | 150 | 150 | 150 |
| PHYSICAL PROPERTIES OF FILM | TRANSMITTANCE OF ALL LIGHT RAYS | | 92 | 92 | 92 |
| | HAZE | | 2 | 2 | 2 |
| | TEAR STRENGTH | | 8160 | 6700 | 5341 |
| | FALLING-BALL IMPACT ABSORPTION ENERGY | | NO FRACTURES | NO FRACTURES | NO FRACTURES |
| | GLASS SCATTERING PREVENTION TEST | | ◎ | ○ | ○ |

Tg: GLASS TRANSITION TEMPERATURE
MD: LONGITUDINAL DIRECTION OF FILM
TD: WIDTH DIRECTION OF FILM

EXAMPLE 15

The heat treatment temperature was set to 220° C., and a drawn film made up of 65 layers in total was obtained with the same equipment and conditions as with Example 2. The obtained results are shown in Table 3.

EXAMPLE 16

Polyethylene terephthalate (glass transition temperature of 81° C.) having intrinsic viscosity of 0.8, to which an infrared absorbent of 1% by weight was added, was employed as the thermoplastic resin A, and a drawn film made up of 65 layers in total was obtained with the same equipment and conditions as with Example 2. The obtained results are shown in Table 3. Note that transmittance of near-infrared rays was 16%.

EXAMPLE 17

An easy-adhesive coating layer made up of silica particles of particle diameter of 30 nm and polyester resin was provided on one face of the film, and a drawn film made up of 65 layers in total was obtained with the same equipment and conditions as with Example 2. The obtained results are shown in Table 3.

EXAMPLE 18

An easy-adhesive coating layer made up of silica particles of particle diameter of 30 nm and polyester/polyurethane resin was provided on one face of the film, and a drawn film made up of 65 layers in total was obtained with the same equipment and conditions as with Example 2. The obtained results are shown in Table 3.

EXAMPLE 19

An easy-adhesive coating layer made up of silica particles of particle diameter of 30 nm and acrylic resin was provided on one face of the film, and a drawn film made up of 65 layers in total was obtained with the same equipment and conditions as with Example 2. The obtained results are shown in Table 3.

EXAMPLE 20

An anti-reflective layer and a hard coat layer having pencil hardness of 4 H were provided on one face of the drawn film made up of 65 layers in total according to Example 17 and an adhesive layer was provided on the other face. The obtained results are shown in Table 3.

TABLE 3

| | | | UNIT | EXAMPLE 15 | EXAMPLE 16 | EXAMPLE 17 |
|---|---|---|---|---|---|---|
| COMPONENTS | THERMO-PLASTIC RESIN A | NAME OF RESIN | — | PET | PET + INFRARED ABSORBENT | PET |
| | | INTRINSIC VISCOSITY | — | 0.8 | 0.8 | 0.8 |
| | | Tg | ° C. | 81 | 81 | 81 |
| | THERMO-PLASTIC RESIN B | NAME OF RESIN | — | PETG 9921 | PETG 9921 | PETG 9921 |
| | | Tg | ° C. | 82 | 82 | 82 |
| | SURFACE LAYER | | — | — | — | EASY-ADHESIVE LAYER |
| LAYERING | No. OF LAYERS | | — | 65 | 65 | 65 |
| | LAYERING RATIO A/B | | — | 5 | 5 | 5 |
| | FILM THICKNESS | | μm | 188 | 188 | 188 |
| FILM FORMATION | STRETCHING MD | | TIMES | 3.2 | 3.2 | 3.2 |
| | TD | | TIMES | 3.3 | 3.3 | 3.3 |
| | HEAT TREATMENT TEMPERATURE | | ° C. | 220 | 150 | 150 |
| PHYSICAL PROPERTIES OF FILM | TRANSMITTANCE OF ALL LIGHT RAYS | | % | 92 | 90 | 90 |
| | HAZE | | % | 2 | 3 | 4 |
| | TEAR STRENGTH | | mN | 6861 | 10010 | 10021 |
| | FALLING-BALL IMPACT ABSORPTION ENERGY | | J | NO FRACTURES | NO FRACTURES | NO FRACTURES |
| | GLASS SCATTERING PREVENTION TEST | | — | ◎ | ◎ | ◎ |

| | | | EXAMPLE 18 | EXAMPLE 19 | EXAMPLE 20 |
|---|---|---|---|---|---|
| COMPONENTS | THERMO-PLASTIC RESIN A | NAME OF RESIN | PET | PET | PET |
| | | INTRINSIC VISCOSITY | 0.8 | 0.8 | 0.8 |
| | | Tg | 81 | 81 | 81 |
| | THERMO-PLASTIC RESIN B | NAME OF RESIN | PETG 9921 | PETG 9921 | PETG 9921 |
| | | Tg | 82 | 82 | 82 |
| | SURFACE LAYER | | EASY-ADHESIVE LAYER | EASY-ADHESIVE LAYER | EASY-ADHESIVE LAYER, ANTI-REFRECTIVE LAYER, HARD COAT LAYER, ADHESIVE LAYER |
| LAYERING | No. OF LAYERS | | 65 | 65 | 65 |
| | LAYERING RATIO A/B | | 5 | 5 | 5 |
| | FILM THICKNESS | | 188 | 188 | 188 |
| FILM FORMATION | STRETCHING MD | | 3.2 | 3.2 | 3.2 |
| | TD | | 3.3 | 3.3 | 3.3 |
| | HEAT TREATMENT TEMPERATURE | | 150 | 150 | 150 |
| PHYSICAL PROPERTIES OF FILM | TRANSMITTANCE OF ALL LIGHT RAYS | | 90 | 92 | 88 |
| | HAZE | | 4 | 2 | 4 |
| | TEAR STRENGTH | | 10029 | 10015 | 11097 |

TABLE 3-continued

| | | | |
|---|---|---|---|
| FALLING-BALL IMPACT ABSORPTION ENERGY GLASS SCATTERING PREVENTION TEST | NO FRACTURES ◎ | NO FRACTURES ◎ | NO FRACTURES ◎ |

Tg: GLASS TRANSITION TEMPERATURE
MD: LONGITUDINAL DIRECTION OF FILM
TD: WIDTH DIRECTION OF FILM

COMPARATIVE EXAMPLE 1

The following single-layer film was obtained with the same equipment and conditions as with Example 1. That is to say, only one extruder was employed, a feed block and static mixer were not employed, polyethylene terephthalate having intrinsic viscosity of 0.8 was employed as thermoplastic resin, whereby a single-layer film was obtained. The obtained film thickness was 188 μm. The obtained results are shown in Table 4.

COMPARATIVE EXAMPLE 2

The following single-layer film was obtained with the same equipment and conditions as with Example 1. That is to say, only one extruder was employed, a feed block and static mixer were not employed, copolymer polyester (PETG9921 manufactured by Eastman Chemical Company) in which terephthalic acid as the dicarboxylic acid component, and 10 mol % 1,4-cyclohexane dimethanol and 90 mol % ethylene glycol as diol components were copolymerized, was employed as thermoplastic resin, whereby a single-layer film was obtained. The obtained film thickness was 188 μm. The obtained results are shown in Table 4.

EXAMPLE 21

A drawn film made up of 7 layers in total was obtained with the same equipment and conditions as with Example 12 except that 7 layer multi-manifold die alone was employed as a layering device, and a laminated film was formed of 4 layers of the thermoplastic resin A and 3 layers of the thermoplastic resin B. However, the discharge rate of the resin was adjusted such that the film thickness was 150 μm. The results of the glass scattering prevention test for the obtained film were satisfactory. The obtained results are shown in Table 5.

EXAMPLE 22

Copolymer polyester (PETG6763 manufactured by Eastman Chemical Company) in which terephthalic acid as the dicarboxylic acid component, and 30 mol % 1,4-cyclohexane dimethanol and 70 mol % ethylene glycol as diol the component were copolymerized, was employed as the thermoplastic resin B.

Both sides of the uniaxial drawn film obtained with the same equipment and conditions as with Example 3 were subjected to corona discharge treatment in the atmosphere, wet tension of a base film was set to 55 mN/m, the processing face thereof was applied with a coating fluid for forming film

TABLE 4

| | | | UNIT | COMPARATIVE EXAMPLE 1 | COMPARATIVE EXAMPLE 2 |
|---|---|---|---|---|---|
| COMPONENTS | THERMO-PLASTIC RESIN A | NAME OF RESIN | — | PET | PETG 9921 |
| | | INTRINSIC VISCOSITY | — | 0.8 | 0.8 |
| | | Tg | ° C. | 81 | 82 |
| | THERMO-PLASTIC RESIN B | NAME OF RESIN | — | — | — |
| | | Tg | ° C. | — | — |
| LAYERING | SURFACE LAYER | | — | — | — |
| | NO. OF LAYERS | | — | — | — |
| | LAYERING RATIO A/B | | — | — | — |
| | FILM THICKNESS | | μm | 188 | 188 |
| FILM FORMATION | STRETCHING | MD | TIMES | 3.2 | 3.2 |
| | | TD | TIMES | 3.3 | 3.3 |
| | HEAT TREATMENT TEMPERATURE | | ° C. | 150 | 150 |
| PHYSICAL PROPERTIES OF FILM | TRANSMITTANCE OF ALL LIGHT RAYS | | % | 92 | 90 |
| | HAZE | | % | 2 | 2 |
| | TEAR STRENGTH | | mN | 1764 | 1501 |
| | FALLING-BALL IMPACT ABSORPTION ENERGY | | J | 57 (FRACTURES) | 70 (FRACTURES) |
| | GLASS SCATTERING PREVENTION TEST | | — | X | X |

Tg: GLASS TRANSITION TEMPERATURE
MD: LONGITUDINAL DIRECTION OF FILM
TD: WIDTH DIRECTION OF FILM layers made up of polyester/melamine cross-linking agent/ silica particles with a mean particle diameter of 140 nm. The applied uniaxial drawn film was introduced to a tenter, preheated in hot air of 100° C., and then stretched by 3.3 times in the lateral direction. The drawn film was subjected to heat treatment in hot air of 150° C. within the tenter, slowly cooled down to room temperature, and then rolled up. The obtained film thickness was 150 μm. The results of the glass scattering prevention test for the obtained film were satisfactory. The evaluation results of the obtained film are shown in Table 5.

EXAMPLE 23

A drawn film was obtained as with Example 22 except that the discharge rate of the resin was adjusted such that the film thickness was 100 μm. The results of the glass scattering prevention test for the obtained film were satisfactory, and the hardened-glass falling-ball test was also satisfactory since the rigid sphere did not pass through the obtained glass. The obtained results are shown in Table 5.

EXAMPLE 24

A drawn film was obtained as with Example 22 except that the discharge rate of the resin was adjusted such that the film thickness was 100 μm, and the heat treatment temperature was set to 230° C. The results of the glass scattering prevention test for the obtained film were satisfactory. The obtained results are shown in Table 5.

EXAMPLE 25

A drawn film was obtained as with Example 22 except that the discharge rate of the resin was adjusted such that the film thickness was 100 μm, an anti-reflective layer and a hard coat layer having pencil hardness of 4 H were provided on one face of the obtained film, and an adhesive layer was provided on the other face of the obtained film. The results of the glass scattering prevention test for the obtained film were satisfactory. The obtained results are shown in Table 5.

EXAMPLE 26

A drawn film made up of 33 layers in total was obtained with the same equipment and conditions as with Example 22 except that the discharge rate of the resin was adjusted such that the film thickness was 100 μm, and copolymer polyester (hereafter, referred to as "PE·BPA-EO/T (10 mol %)") (glass transition temperature of 78° C., Young's modulus of 1900 MPa) in which terephthalic acid as the dicarboxylic acid component, 90 mol % ethylene glycol and 10 mol % bisphenol A ethylene oxide additive as the diol component were copolymerized, was employed as the thermoplastic resin B. The results of the glass scattering prevention test for the obtained film were satisfactory. The obtained results are shown in Table 5.

EXAMPLE 27

A drawn film made up of 33 layers in total was obtained with the same equipment and conditions as with Example 22 except that the discharge rate of the resin was adjusted such that the film thickness was 100 μm, and copolymer polyester (hereafter, referred to as "PE·BPA-EO/T (20 mol %)") (glass transition temperature of 78° C., Young's modulus of 1900 MPa) in which terephthalic acid as the dicarboxylic acid component, 80 mol % ethylene glycol and 20 mol % bisphenol A ethylene oxide additive as the diol component were copolymerized, was employed as the thermoplastic resin B. The results of the glass scattering prevention test for the obtained film were passed. The obtained results are shown in Table 5.

TABLE 5

| | | | UNIT | EXAMPLE 21 | EXAMPLE 22 | EXAMPLE 23 | EXAMPLE 24 |
|---|---|---|---|---|---|---|---|
| COMPONENTS | THERMOPLASTIC RESIN A | NAME OF RESIN | — | PET | PET | PET | PET |
| | | INTRINSIC VISCOSITY | — | 0.8 | 0.8 | 0.8 | 0.8 |
| | | Tg | °C. | 81 | 81 | 81 | 81 |
| | THERMOPLASTIC RESIN B | NAME OF RESIN | — | PETG 9921 | PETG 6763 | PETG 6763 | PETG 6763 |
| | | Tg | °C. | 82 | 81 | 81 | 81 |
| | | SURFACE LAYER | — | — | EASY-ADHESIVE LAYER | EASY-ADHESIVE LAYER | EASY-ADHESIVE LAYER |
| LAYERING | | No. OF LAYERS | — | 7 | 33 | 33 | 33 |
| | | LAYERING RATIO A/B | — | 5 | 5 | 5 | 5 |
| | | FILM THICKNESS | μm | 150 | 150 | 100 | 100 |
| FILM FORMATION | STRETCHING | MD | TIMES | 3.2 | 3.2 | 3.2 | 3.2 |
| | | TD | TIMES | 3.3 | 3.3 | 3.3 | 3.3 |
| | HEAT TREATMENT TEMPERATURE | | °C. | 150 | 150 | 150 | 230 |
| PHYSICAL PROPERTIES OF FILM | TRANSMITTANCE OF ALL LIGHT RAYS | | % | 92 | 92 | 93 | 93 |
| | HAZE | | % | 2 | 2 | 1 | 1 |
| | TEAR STRENGTH | | mN | 10000 | 26700 | 25000 | 12000 |
| | IMPACT STRENGTH | | J | 13 | 14 | 14 | 14 |
| | FACE-IMPACT STRENGTH | | J/mm | 31 | 30 | 30 | 20 |

| | | | EXAMPLE 25 | EXAMPLE 26 | EXAMPLE 27 |
|---|---|---|---|---|---|
| COMPONENTS | THERMOPLASTIC | NAME OF RESIN | PET | PET | PET |

TABLE 5-continued

| | | | | | |
|---|---|---|---|---|---|
| | RESIN A | INTRINSIC VISCOSITY | 0.8 | 0.8 | 0.8 |
| | | Tg | 81 | 81 | 81 |
| | THERMO-PLASTIC RESIN B | NAME OF RESIN | PETG 6763 | PE • BPA-EO/T (10 mol %) | PE • BPA-EO/T (20 mol %) |
| | | Tg | 81 | 79 | 78 |
| | SURFACE LAYER | | EASY-ADHESIVE LAYER, ANTI-REFRECTIVE LAYER, HARD COAT LAYER, ADHESIVE LAYER | EASY-ADHESIVE LAYER | EASY-ADHESIVE LAYER |
| LAYERING | No. OF LAYERS | | 33 | 33 | 33 |
| | LAYERING RATIO A/B | | 5 | 5 | 5 |
| | FILM THICKNESS | | 100 | 100 | 100 |
| FILM FORMATION | STRETCHING MD | | 3.2 | 3.2 | 3.2 |
| | TD | | 3.3 | 3.3 | 3.3 |
| | HEAT TREATMENT TEMPERATURE | | 150 | 150 | 150 |
| PHYSICAL PROPERTIES OF FILM | TRANSMITTANCE OF ALL LIGHT RAYS | | 93 | 93 | 93 |
| | HAZE | | 1 | 1 | 1 |
| | TEAR STRENGTH | | 25000 | 5210 | 6120 |
| | IMPACT STRENGTH | | 14 | 13 | 15 |
| | FACE-IMPACT STRENGTH | | 27 | 25 | 28 |

Tg: GLASS TRANSITION TEMPERATURE
MD: LONGITUDINAL DIRECTION OF FILM
TD: WIDTH DIRECTION OF FILM
IMPACT STRENGTH: IMPACT ABSORPTION ENERGY

COMPARATIVE EXAMPLE 3

A drawn film was obtained as with Comparative Example 1 except that the discharge was adjusted such that the film thickness was 100 μm, the film was stretched in the longitudinal direction, following which the both sides of the film were subjected to corona discharge treatment in the atmosphere, wet tension of a base film was set to 55 mN/m, and the processing face thereof was applied with a coating fluid for forming film layers made up of polyester/melamine cross-linking agent/silica particles of mean particle diameter of 140 nm. The results of the glass scattering prevention test for the obtained film were not satisfactory, and the hardened-glass falling-ball test was also unsatisfactory since the rigid sphere passed through the obtained glass. The evaluation results of the obtained film are shown in Table 6.

COMPARATIVE EXAMPLE 4

A film having film thickness of 100 μm was obtained as with Example 22 except that the discharge was adjusted such that the film thickness was 100 μm, copolymer polyester (hereafter, referred to as "PET/S") (glass transition temperature of 2° C., Young's modulus of 85 MPa) in which sebacic acid of 40 mol % and terephthalic acid of 60 mol % as dicarboxylic acid components, ethylene glycol of 100 mol % as diol components were copolymerized, was employed as the thermoplastic resin B, an anti-reflective layer and a hard coat layer having pencil hardness of 4 H were provided on one face of the obtained film, and an adhesive layer was provided on the other face of the obtained film. The hardened-glass falling-ball test was unsatisfactory since the rigid sphere passed through the obtained glass. The evaluation results of the obtained film are shown in Table 6.

TABLE 6

| | | | UNIT | COMPARATIVE EXAMPLE 3 | COMPARATIVE EXAMPLE 4 |
|---|---|---|---|---|---|
| COMPONENTS | THERMO-PLASTIC RESIN A | NAME OF RESIN | — | PET | PET |
| | | INTRINSIC VISCOSITY | — | 0.8 | 0.8 |
| | | Tg | ° C. | 81 | 81 |
| | THERMO-PLASTIC RESIN B | NAME OF RESIN | — | — | PET/S (40 mol %) |
| | | Tg | ° C. | — | 2 |
| | SURFACE LAYER | | — | EASY-ADHESIVE LAYER | EASY-ADHESIVE LAYER, ANTI-REFRECTIVE LAYER, HARD COAT LAYER, |

TABLE 6-continued

|  | UNIT | COMPARATIVE EXAMPLE 3 | COMPARATIVE EXAMPLE 4 |
|---|---|---|---|
| | | | ADHESIVE LAYER |
| LAYERING No. OF LAYERS | — | — | 33 |
| LAYERING RATIO A/B | — | — | 5 |
| FILM THICKNESS | μm | 100 | 100 |
| FILM FORMATION STRETCHING MD | TIMES | 3.2 | 3.2 |
| TD | TIMES | 3.3 | 3.3 |
| HEAT TREATMENT TEMPERATURE | ° C. | 150 | 150 |
| PHYSICAL PROPERTIES OF FILM TRANSMITTANCE OF ALL LIGHT RAYS | % | 93 | 88 |
| HAZE | % | 1 | 4 |
| TEAR STRENGTH | mN | 1030 | 24000 |
| IMPACT STRENGTH | J | 5 | 7 |
| FACE-IMPACT STRENGTH | J/mm | 7 | 17 |

Tg: GLASS TRANSITION TEMPERATURE
MD: LONGITUDINAL DIRECTION OF FILM
TD: WIDTH DIRECTION OF FILM

INDUSTRIAL APPLICABILITY

In the event of applying a glass protecting film onto glass, the film has high transparency, and also has high face-impact resistance which can endure great impact strength applied to the glass. Accordingly, the glass protecting film is effectively employed as a display glass protecting film for CRT displays which need to have high transparency and also cause huge explosions at the time of glass being subjected to damage, or liquid crystal displays, plasma displays, organic EL displays, field emission displays, and so forth, wherein it is necessary to protect the expensive display devices. Also, the glass protecting film protects glass from disasters such as typhoons, is hardly damaged, and is capable of drastically preventing glass scattering due to damage, and accordingly is effectively employed as a windowpane protecting film for structures such as public facilities, houses, or large buildings, automobiles, HST (High-Speed Trains), and electric trains.

The invention claimed is:

1. A glass protecting film, comprising a multi-layer structure which comprises at least two kinds of thermoplastic resin of which the difference in glass transition temperature is 40° C. or lower, in which face-impact strength is 18 J/mm or more, in which haze is 3% or less and tearing-propagation resistance in the longitudinal and/or width direction is 10 N/mm or more.

2. A glass protecting film, comprising a multi-layer structure which comprises at least, two kinds of thermoplastic resin of which difference in glass transition temperature is 40° C. or lower, in which impact strength is 8 to 40 J, in which haze is 3% or less and tearing-propagation resistance in the longitudinal and/or width direction is 10 N/mm or more.

3. The glass protecting film according to claim 1 or claim 2, in which the glass transition temperature of thermoplastic resin which is comprised in the film is 50° C. or higher.

4. The glass protecting film according to claim 1 or claim 2, further comprising a layer in which at least one kind of thermoplastic resin of the thermoplastic resins comprises polyester having 1,4-cyclohexane dimethanol as one of the components.

5. The glass protecting film according to claim 4, in which the amount of copolymerization of 1,4-cyclohexane dimethanol is 20 to 50 mol %.

6. The glass protecting film according to claim 4, in which the amount of copolymerization of 1,4-cyclohexane dimethanol is 30 to 40 mol %.

7. The glass protecting film according to claim 1 or claim 2, in which at least one kind of thermoplastic resin of the thermoplastic resins comprises thermoplastic resin having 2,2-bis (4'-β-hydroxyethoxyphenyl) propane group.

8. The glass protecting film according to claim 1 or claim 2, in which thermoplastic resin which is comprised in each layer has a tensile elastic modulus of 1400 MPa or more.

9. The glass protecting film according to claim 1 or claim 2, in which a layer structure is a multi-layer structure of 8 to 256 layers.

10. The glass protecting film according to claim 1 or claim 2, satisfying the following formula (1)

Film thickness: T (μm)

Number of total layers: L $$1.2 \leq T/L \leq 30 \tag{1}$$

11. The glass protecting film according to claim 1 or claim 2, in which the thickness of a layer which comprises polyester having 1,4-cyclohexane dimethanol as one of the components is 0.05 to 30 μm.

12. The glass protecting film according to claim 1 or claim 2, in which film thickness is 10 to 500 μm.

13. The glass protecting film according to claim 1 or claim 2, further comprising an adhesive layer on at least one face thereof.

14. The glass protecting film according to claim 1 or claim 2, further comprising an anti-reflective layer on at least one, face thereof.

15. A glass protecting film according to claim 1 or claim 2, further comprising a hard coat layer on at least one face thereof.

16. The glass protecting film according to claim 1 or claim 2, wherein pencil hardness of at least one face thereof is 2H or more.

17. The glass protecting film according to claim 1 or claim 2, in which transmittance of near-infrared rays is 20% or less.

18. The glass protecting film according to claim 1 or claim 2, in which transmittance of visible light is 70% or more.

19. The glass protecting film according claim 1 or claim 2, in which transmittance of visible light is 80% or more.

20. The glass protecting film according to claim 1 or claim 2, in which transmittance of visible light is 90% or more.

21. The glass protecting film according to claim 1 or claim 2, wherein tensile elongation at break of at least one direction of the longitudinal and width directions is 100 to 300%, and tensile stress at break is 120 to 400 MPa.

22. The glass protecting film according to claim 1 or claim 2, in which the glass protecting film is stretched in at least one direction.

23. The glass protecting film according to claim 1 or claim 2, in which the glass protecting film is applied onto the front face of a flat display.

24. The glass protecting film according to claim 23, in which the flat display is a flat CRT display.

* * * * *